US012505775B1

(12) United States Patent
Cui et al.

(10) Patent No.: US 12,505,775 B1
(45) Date of Patent: Dec. 23, 2025

(54) DISPLAY DRIVER, METHOD FOR DRIVING DISPLAY, CHIP AND ELECTRONIC DEVICE

(71) Applicant: Beijing ESWIN Computing Technology Co., Ltd., Beijing (CN)

(72) Inventors: Xin Cui, Beijing (CN); Chiwoo Lee, Beijing (CN)

(73) Assignee: Beijing ESWIN Computing Technology Co., Ltd., Beijing (CN)

( * ) Notice: Subject to any disclaimer, the term of this patent is extended or adjusted under 35 U.S.C. 154(b) by 0 days.

(21) Appl. No.: 18/937,619

(22) Filed: Nov. 5, 2024

(30) Foreign Application Priority Data

Jun. 24, 2024 (CN) ......................... 202410816213.5

(51) Int. Cl.
*G09G 3/20* (2006.01)

(52) U.S. Cl.
CPC ......... *G09G 3/20* (2013.01); *G09G 2320/046* (2013.01); *G09G 2320/0626* (2013.01); *G09G 2330/021* (2013.01); *G09G 2360/16* (2013.01)

(58) Field of Classification Search
None
See application file for complete search history.

(56) References Cited

U.S. PATENT DOCUMENTS

| | | | | |
|---|---|---|---|---|
| 2010/0156774 A1* | 6/2010 | Broughton | G09G 3/3607 | 345/88 |
| 2019/0229159 A1* | 7/2019 | Wu | G09G 3/2003 | |
| 2023/0237967 A1* | 7/2023 | Byun | G09G 3/20 | 345/76 |

* cited by examiner

*Primary Examiner* — Aneeta Yodichkas
(74) *Attorney, Agent, or Firm* — Kolitch Romano Dascenzo Gates LLC

(57) ABSTRACT

A display driver is provided. The display driver includes an OPR generating module, a brightness limiting module and a driving module. The OPR generating module is configured to generate a reference OPR corresponding to an image; the brightness limiting module is configured to acquire a plurality of brightness ranges and an initial brightness value corresponding to the image, one brightness range corresponding to one OPR range; the brightness limiting module is further configured to acquire a reduced brightness value corresponding to the reference OPR by performing interpolation at the reference OPR based on the initial brightness value, the plurality of brightness ranges and OPR ranges corresponding to the plurality of brightness ranges, the reduced brightness value being smaller than the initial brightness value; and the driving module is configured to drive the display panel to display the image based on the reference OPR and the reduced brightness value.

20 Claims, 5 Drawing Sheets

DISPLAY DRIVER, METHOD FOR DRIVING DISPLAY, CHIP AND ELECTRONIC DEVICE

CROSS-REFERENCE TO RELATED APPLICATION

This application is based on and claims priority to Chinese Patent Application No. 202410816213.5, filed on 24 Jun. 2024, the disclosure of which is herein incorporated by reference in its entirety.

TECHNICAL FIELD

The present disclosure relates to the field of display technologies, and in particular, relates to a display driver, a method for driving a display, a chip and an electronic device.

BACKGROUND

With respect to an electronic device provided with a display panel, displaying an image using the display panel is a function of high power consumption. Therefore, a display driver is needed to control the brightness of the display panel when the display panel displays the image, thereby controlling the power consumption of the display panel.

SUMMARY

The present disclosure provides a display driver, a method for driving a display, a chip and an electronic device. Technical solutions are described as follows.

Some embodiments of the present disclosure provide a display driver. The display driver includes an on-pixel ratio (OPR) generating module, a brightness limiting module and a driving module, the OPR generating module being connected to the brightness limiting module and the driving module, the brightness limiting module being further connected to the driving module. The OPR generating module is configured to generate a reference OPR corresponding to an image and transmit the reference OPR to the brightness limiting module and the driving module, the reference OPR indicating an OPR at which a display panel displays the image; the brightness limiting module is configured to acquire a plurality of brightness ranges and an initial brightness value corresponding to the image, one brightness range corresponding to one OPR range, a start point value of the brightness range being greater than an end point value of the brightness range; the brightness limiting module is further configured to acquire a reduced brightness value corresponding to the reference OPR by performing interpolation at the reference OPR based on the initial brightness value, the plurality of brightness ranges and OPR ranges corresponding to the plurality of brightness ranges, and transmit the reduced brightness value to the driving module, the reduced brightness value being smaller than the initial brightness value; and the driving module is configured to drive the display panel to display the image based on the reference OPR and the reduced brightness value.

In some embodiments, the brightness limiting module is configured to: acquire, based on the initial brightness value, the plurality of brightness ranges, and the OPR ranges corresponding to the plurality of brightness ranges, a first OPR corresponding to the initial brightness value, a maximum reducible brightness value taking the initial brightness value as a start point value, and a second OPR corresponding to the maximum reducible brightness value; and acquire the reduced brightness value corresponding to the reference OPR by performing interpolation at the reference OPR based on the initial brightness value, the maximum reducible brightness value, the first OPR and the second OPR.

In some embodiments, the brightness limiting module is configured to: acquire the first OPR based on the initial brightness value, start point values of the plurality of brightness ranges and OPRs corresponding to the start point values; and acquire the maximum reducible brightness value and the second OPR based on the initial brightness value, the start point values of the plurality of brightness ranges, end point values of the plurality of brightness ranges, and OPRs corresponding to the end point values.

In some embodiments, the start point values of the plurality of brightness ranges include a first start point value and a second start point value, the first start point value being greater than the initial brightness value, the second start point value being smaller than the initial brightness value; and the brightness limiting module is configured to: acquire the first OPR by performing linear interpolation at the initial brightness value based on the first start point value, an OPR corresponding to the first start point value, the second start point value and an OPR corresponding to the second start point value.

In some embodiments, the start point values of the plurality of brightness ranges include a first start point value and a second start point value, the first start point value being greater than the initial brightness value, the second start point value being smaller than the initial brightness value; the end point values of the plurality of brightness ranges include a first end point value and a second end point value, the first end point value and the second end point value corresponding to a same OPR; and the brightness limiting module is configured to: determine the OPR corresponding to the first end point value and the second end point value as the second OPR; and acquire the maximum reducible brightness value by performing linear interpolation at the initial brightness value based on the first start point value, the second start point value, the first end point value and the second end point value.

In some embodiments, the brightness limiting module is configured to: acquire the reduced brightness value by performing linear interpolation at the reference OPR based on the initial brightness value, the maximum reducible brightness value, the first OPR and the second OPR.

Some embodiments of the present disclosure provide a method for driving a display. The method includes: generating, by an OPR generating module, a reference OPR corresponding to an image and transmitting the reference OPR to a brightness limiting module and a driving module, the reference OPR indicating an OPR at which a display panel displays the image; acquiring, by the brightness limiting module, a plurality of brightness ranges and an initial brightness value corresponding to the image, one brightness range corresponding to one OPR range, a start point value of the brightness range being greater than an end point value of the brightness range; acquiring, by the brightness limiting module, a reduced brightness value corresponding to the reference OPR by performing interpolation at the reference OPR based on the initial brightness value, the plurality of brightness ranges and OPR ranges corresponding to the plurality of brightness ranges, and transmitting the reduced brightness value to the driving module, the reduced brightness value being smaller than the initial brightness value; and driving, by the driving module, the display panel to display the image based on the reference OPR and the reduced brightness value.

In some embodiments, acquiring the reduced brightness value corresponding to the reference OPR by performing interpolation at the reference OPR based on the initial brightness value, the plurality of brightness ranges and the OPR ranges corresponding to the plurality of brightness ranges includes: acquiring, based on the initial brightness value, the plurality of brightness ranges, and the OPR ranges corresponding to the plurality of brightness ranges, a first OPR corresponding to the initial brightness value, a maximum reducible brightness value taking the initial brightness value as a start point value, and a second OPR corresponding to the maximum reducible brightness value; and acquiring the reduced brightness value corresponding to the reference OPR by performing interpolation at the reference OPR based on the initial brightness value, the maximum reducible brightness value, the first OPR and the second OPR.

In some embodiments, acquiring, based on the initial brightness value, the plurality of brightness ranges, and the OPR ranges corresponding to the plurality of brightness ranges, the first OPR corresponding to the initial brightness value, the maximum reducible brightness value taking the initial brightness value as the start point value, and the second OPR corresponding to the maximum reducible brightness value includes: acquiring the first OPR based on the initial brightness value, start point values of the plurality of brightness ranges and OPRs corresponding to the start point values; and acquiring the maximum reducible brightness value and the second OPR based on the initial brightness value, the start point values of the plurality of brightness ranges, end point values of the plurality of brightness ranges, and OPRs corresponding to the end point values.

In some embodiments, the start point values of the plurality of brightness ranges include a first start point value and a second start point value, the first start point value being greater than the initial brightness value, the second start point value being smaller than the initial brightness value; and acquiring the first OPR based on the initial brightness value, the start point values of the plurality of brightness ranges and the OPRs corresponding to the start point values includes: acquiring the first OPR by performing linear interpolation at the initial brightness value based on the first start point value, an OPR corresponding to the first start point value, the second start point value and an OPR corresponding to the second start point value.

In some embodiments, the start point values of the plurality of brightness ranges include a first start point value and a second start point value, the first start point value being greater than the initial brightness value, the second start point value being smaller than the initial brightness value; the end point values of the plurality of brightness ranges include a first end point value and a second end point value, the first end point value and the second end point value corresponding to a same OPR; and acquiring the maximum reducible brightness value and the second OPR based on the initial brightness value, the start point values of the plurality of brightness ranges, the end point values of the plurality of brightness ranges, and the OPRs corresponding to the end point values includes: determining the OPR corresponding to the first end point value and the second end point value as the second OPR; and acquiring the maximum reducible brightness value by performing linear interpolation at the initial brightness value based on the first start point value, the second start point value, the first end point value and the second end point value.

In some embodiments, acquiring the reduced brightness value corresponding to the reference OPR by performing interpolation at the reference OPR based on the initial brightness value, the maximum reducible brightness value, the first OPR and the second OPR includes: acquiring the reduced brightness value by performing linear interpolation at the reference OPR based on the initial brightness value, the maximum reducible brightness value, the first OPR and the second OPR.

Some embodiments of the present disclosure provide a chip. The chip includes a processor, wherein the processor, when loading at least one instruction from a memory and executing the at least one instruction, causes a device equipped with the chip to perform: generating, by an OPR generating module, a reference OPR corresponding to an image and transmitting the reference OPR to a brightness limiting module and a driving module, the reference OPR indicating an OPR at which a display panel displays the image; acquiring, by the brightness limiting module, a plurality of brightness ranges and an initial brightness value corresponding to the image, one brightness range corresponding to one OPR range, a start point value of the brightness range being greater than an end point value of the brightness range; acquiring, by the brightness limiting module, a reduced brightness value corresponding to the reference OPR by performing interpolation at the reference OPR based on the initial brightness value, the plurality of brightness ranges and OPR ranges corresponding to the plurality of brightness ranges, and transmitting the reduced brightness value to the driving module, the reduced brightness value being smaller than the initial brightness value; and driving, by the driving module, the display panel to display the image based on the reference OPR and the reduced brightness value.

Some embodiments of the present disclosure provide an electronic device, including the chip as described above.

DETAILED DESCRIPTION

For clearer descriptions of the objectives, technical solutions, and advantages of the present disclosure, embodiments of the present disclosure are described in detail hereinafter with reference to the accompanying drawings.

In the design of a driver integrated circuit of a display panel, how to reduce the power consumption and how to avoid panel burn-in are always important design factors. For these two design factors, automatic current limit (ACL) is proposed to reduce the power consumption of the display panel and to avoid panel burn-in. For example, ACL is used for reducing current that drives the display panel to display an image, such that the brightness of the display panel is reduced, thereby reducing the power consumption of the display panel and avoiding panel burn-in.

In the related art, a reduced brightness value is acquired by substituting an on-pixel ratio (OPR) and an initial brightness value corresponding to the image into a specified formula for calculation, wherein parameters of the specified formula correspond to characteristics of the display panel. However, because the characteristics of the display panel are fixed, the reduced brightness value remains the same in the case that a reference OPR and the initial brightness value remain unchanged, such that the reduced brightness value cannot be flexibly varied based on user's needs in the case that the reference OPR remains unchanged.

Figure 1:
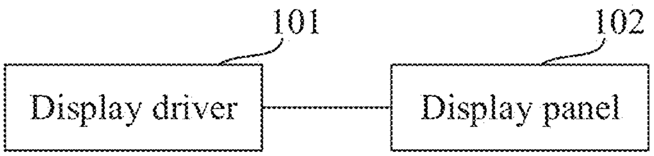
FIG. 1 is a schematic diagram of an implementation environment according to some embodiments of the present disclosure.

Some embodiments of the present disclosure provide a display driver. The display driver is used to reduce the power consumption of a display panel by reducing a brightness value of displaying an image by the display panel. In the case of controlling the brightness value of the display panel by limiting current, a method that uses the display driver provided by the present disclosure may be referred to as an ACL method. FIG. 1 is a schematic diagram of an implementation environment according to some embodiments of the present disclosure. As illustrated in FIG. 1, the implementation environment includes a display driver 101 and a display panel 102. The display driver 101 and the display panel 102 are connected in a wired or wireless manner. For example, the display driver 101 is a drive integrated circuit (drive IC), and the display panel is an organic light emitting diode (OLED) or a liquid crystal display (LCD). The display driver 101 and the display panel 102 may be disposed in the same or different electronic devices. In the case that the display driver 101 and the display panel 102 are disposed in the same electronic device, the electronic device may be referred to as a module (MDL).

The electronic device may be any electronic product capable of interacting with a user in one or more ways including a keyboard, a touch panel, a touch screen, a remote controller, a voice interaction device or a handwriting device, such as a personal computer (PC), a mobile phone, a smart phone, a personal digital assistant (PDA), a wearable device, a pocket PC (PPC), a tablet computer, an intelligent vehicle, a smart TV, a smart speaker, an intelligent voice interaction device, an intelligent household electrical appliance, a vehicle-mounted terminal and an aircraft. It should be understood by those skilled in the art that the above-mentioned electronic devices are merely examples, and other existing or possible future electronic devices that may be applicable to the present disclosure should also be included in protection scope of the present disclosure and be incorporated herein by reference.

Figure 2:
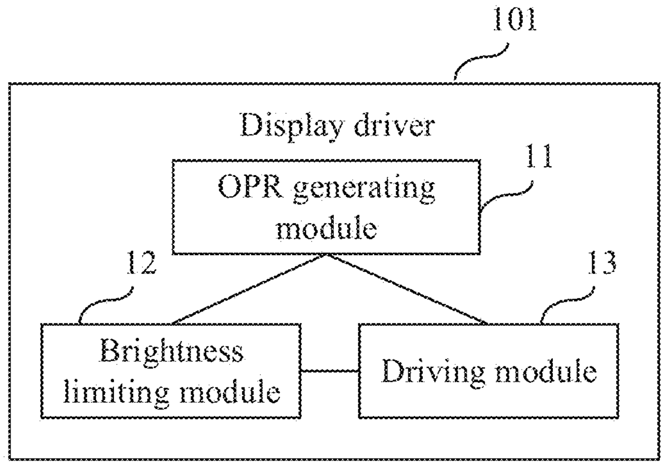
FIG. 2 is a schematic structural diagram of a display driver according to some embodiments of the present disclosure.

FIG. 2 is a schematic structural diagram of a display driver according to some embodiments of the present disclosure. As illustrated in FIG. 2, the display driver 101 includes an OPR generating module 11, a brightness limiting module 12 and a driving module 13, wherein the OPR generating module 11 is connected to the brightness limiting module 12 and the driving module 13, and the brightness limiting module 12 is further connected to the driving module 13. In addition, in some embodiments, the driving module 13 is connected to the display panel 102.

In the embodiments of the present disclosure, the OPR generating module 11 is configured to acquire a reference OPR corresponding to an image and transmit the reference OPR to the brightness limiting module 12 and the driving module 13, the reference OPR indicating an OPR at which the display panel displays the image; the brightness limiting module 12 is configured to acquire a plurality of brightness ranges and an initial brightness value corresponding to the image, one brightness range corresponding to one OPR range, a start point value of the brightness range being greater than an end point value of the brightness range; the brightness limiting module 12 is configured to acquire a reduced brightness value corresponding to the reference OPR by performing interpolation at the reference OPR based on the initial brightness value, the plurality of brightness ranges and OPR ranges corresponding to the plurality of brightness ranges, and transmit the reduced brightness value to the driving module 13, the reduced brightness value being smaller than the initial brightness value; and the driving module 13 is configured to drive the display panel to display the image based on the reference OPR and the reduced brightness value.

In some embodiments, the initial brightness value corresponding to the image refers to a brightness value stored in a register and prepared for the display panel to display the image. That is, the initial brightness value corresponding to the image is a brightness value acquired before a brightness value for displaying the image is adjusted using a method according to some embodiments of the present disclosure. In some embodiments, there are at least two brightness ranges. In the case that the number of the brightness ranges is more than two, any two brightness ranges may be chosen from the plurality of brightness ranges, and these two brightness ranges are used as brightness ranges for acquiring the reduced brightness value. In some embodiments, end point values of the two brightness ranges correspond to a same OPR.

In some embodiments, the OPR generating module 11 is configured to acquire the number of red on-pixels, the number of green on-pixels and the number of blue on-pixels of the display panel for displaying the image, and acquire the reference OPR corresponding to the image based on the number of red on-pixels, the number of green on-pixels, the number of blue on-pixels and the total number of pixels included in the display panel.

For example, the red on-pixels are referred to as red pixels to be turned on in the display panel to display the image; the green on-pixels are referred to as green pixels to be turned on in the display panel to display the image; and the blue on-pixels are referred to as blue pixels to be turned on in the display panel to display the image.

For example, the OPR generating module 11 is configured to calculate the reference OPR according to the following formula 1:

$$OPR_{refer}=(K*R+S*G+T*B)/N; \quad \text{(Formula 1)}$$

wherein $OPR_{refer}$ represents the reference OPR, R represents the number of red on-pixels, G represents the number of green on-pixels, B represents the number of blue on-pixels, N represents the total number of pixels, and K, S and T are coefficients.

For example, K, S and T are all 1, or the values of K, S and T are determined based on material characteristics of the display panel. In the case that K, S and T are all 1, the reference OPR is calculated simply, conveniently and efficiently. In the case that the values of K, S and T are determined based on the material characteristics of the display panel, the calculated reference OPR has high adaptability to the display panel.

In some embodiments, the display driver 101 further includes a first register, wherein the first register is connected to the brightness limiting module 12 and configured to store the initial brightness value. The brightness limiting module 12 acquires the initial brightness value by reading the initial brightness value from the first register. The type of the first register is not limited in the embodiments of the present disclosure. In some embodiments, the first register is further connected to an application processor (AP), the initial brightness value corresponding to the image is written into the first register by the application processor, and the application processor and the display driver 101 may be disposed in the same or different electronic devices.

In the embodiments of the present disclosure, the brightness value may be represented by a display brightness value (DBV). The reference OPR may be represented as a percentage, or as a value corresponding to the percentage in a reference value range. For example, in the case that the reference value range is [0,1023], the reference OPR is 1023 when an OPR is 100%.

In some embodiments, the display driver 101 further includes a second register, wherein the second register is connected to the brightness limiting module 12 and configured to store the plurality of brightness ranges. The brightness limiting module 12 acquires the plurality of brightness ranges by reading the plurality of brightness ranges from the second register. In some embodiments, the second register is further connected to an application processor, and the plurality of brightness ranges are written into the second register by the application processor. Alternatively, the display driver 101 further includes an input interface, the second register is connected to the input interface, and the input interface is configured to receive the plurality of brightness ranges input by the user and transmit the plurality of brightness ranges to the second register, such that the second register stores the plurality of brightness ranges. Regardless of whether the plurality of brightness ranges are transmitted by the application processor or the input interface, the values of the plurality of brightness ranges may be set based on user's needs. The second register and the first register may be of the same or different types, and the first register and the second register may be the same register in the case that the first register and the second register are of the same type.

In some embodiments, start point values of the plurality of brightness ranges include a first start point value and a second start point value. The first start point value is greater than the initial brightness value, and the second start point value is smaller than the initial brightness value. End point values of the plurality of brightness ranges include a first end point value and a second end point value. The first end point value and the second end point value correspond to a same OPR. For example, both of the first end point value and the second end point value correspond to a maximum OPR that the display panel is capable to displaying.

For example, in the case that the reference OPR is represented as a percentage, the maximum OPR is represented as a percentage, and the maximum OPR is 100%; and in the case that the reference OPR is represented as a value corresponding to a percentage in the reference value range, the maximum OPR is represented as a value corresponding to a percentage in the reference value range. For example, the maximum OPR is 1023.

In some embodiments, the brightness limiting module 12 is further configured to: determine whether the initial brightness value is greater than a brightness threshold; in the case that the initial brightness value is greater than the brightness threshold, acquire a reduced brightness value corresponding to the reference OPR by performing interpolation at the reference OPR based on the initial brightness value, the plurality of brightness ranges and OPR ranges corresponding to the plurality of brightness ranges, and transmit the reduced brightness value to the driving module 13; and in the case that the initial brightness value is not greater than the brightness threshold, transmit the initial brightness value to the driving module 13. The brightness threshold may be set based on experience or actual needs, which is not limited in the embodiments of the present disclosure.

In the case that the initial brightness value is greater than the brightness threshold, this case indicates that the display panel displays the image at high brightness, causing a high possibility of burn-in. In the embodiments of the present disclosure, in the case that the initial brightness value is greater than the brightness threshold, the brightness limiting module 12 acquires the reduced brightness value corresponding to the reference OPR by performing interpolation at the reference OPR based on the initial brightness value, the plurality of brightness ranges and the OPR ranges corresponding to the plurality of brightness ranges, and transmits the reduced brightness value to the driving module 13. Therefore, the driving module 13 is capable of driving the display panel to display the image at a lower brightness value, thereby reducing the possibility of burn-in of the display panel while reducing the power consumption of the display panel for image display.

In some embodiments, the brightness limiting module 12 is configured to: acquire, based on the initial brightness value, the plurality of brightness ranges, and the OPR ranges corresponding to the plurality of brightness ranges, a first OPR corresponding to the initial brightness value, a maximum reducible brightness value taking the initial brightness value as a start point value, and a second OPR corresponding to the maximum reducible brightness value; and acquire the reduced brightness value corresponding to the reference OPR by performing interpolation at the reference OPR based on the initial brightness value, the maximum reducible brightness value, the first OPR and the second OPR.

In some embodiments, the brightness limiting module 12 is configured to: acquire the first OPR based on the initial brightness value, the start point values of the plurality of brightness ranges and OPRs corresponding to the start point values; and acquire the maximum reducible brightness value and the second OPR based on the initial brightness value, the start point values of the plurality of brightness ranges, the end point values of the plurality of brightness ranges, and OPRs corresponding to the end point values.

In the case that the initial brightness value is within a brightness interval composed of the start point values of the plurality of brightness ranges, the brightness limiting module 12 is capable of acquiring the first OPR by performing linear interpolation at the initial brightness value. In the case that the initial brightness value is not within a brightness interval composed of the start point values of the plurality of brightness ranges, the brightness limiting module 12 is also capable of acquiring the first OPR by performing linear interpolation at the initial brightness value.

In the embodiments of the present disclosure, the first OPR is a start point of the OPR in the case that the initial brightness value is taken as a start point of brightness reduction.

For example, in the case that the start point values of the plurality of brightness ranges include the first start point value and the second start point value, the brightness limiting module 12 is configured to acquire the first OPR by performing linear interpolation at the initial brightness value based on the first start point value, an OPR corresponding to the first start point value, the second start point value and an OPR corresponding to the second start point value.

In the embodiments of the present disclosure, the initial brightness value may be represented as WRDISBV, the first start point value may be represented as DBV_start, the second start point value may be represented as DBV_end, the OPR corresponding to the first start point value may be represented as ACL_th_start, the OPR corresponding to the second start point value may be represented as ACL_th_end, and the first OPR may be represented as ACL_th.

Figure 3:
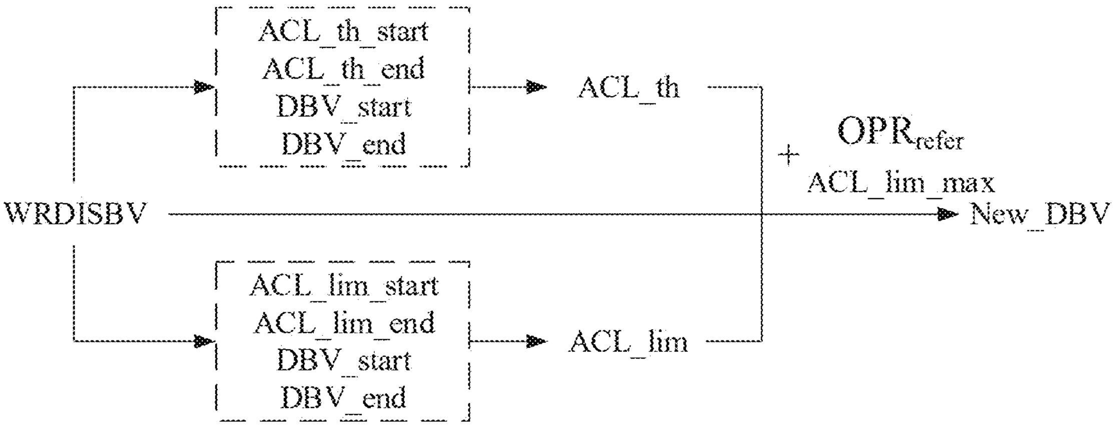
FIG. 3 is a schematic diagram of a process of acquiring a reduced brightness value according to some embodiments of the present disclosure.

FIG. 3 is a schematic diagram of a process of acquiring a reduced brightness value according to some embodiments of the present disclosure. Referring to FIG. 3, ACL_th is acquired based on WRDISBV and ACL_th_start, ACL_th_end, DBV_start and DBV_end read from the second register. For example, based on ACL_th_start, ACL_th_end, DBV_start and DBV_end, ACL_th is acquired by performing linear interpolation at WRDISBV according to the following Formula 2 and Formula 3.

$$ACL\_th = ACL\_th\_\text{start} + (DBV\_\text{start} - \text{WRDISBV}) * S1; \quad \text{(Formula 2)}$$

$$S1 = (ACL\_th\_end - ACL\_th\_\text{start}) / (DBV\_\text{start} - DBV\_end); \quad \text{(Formula 3)}$$

Figure 4:
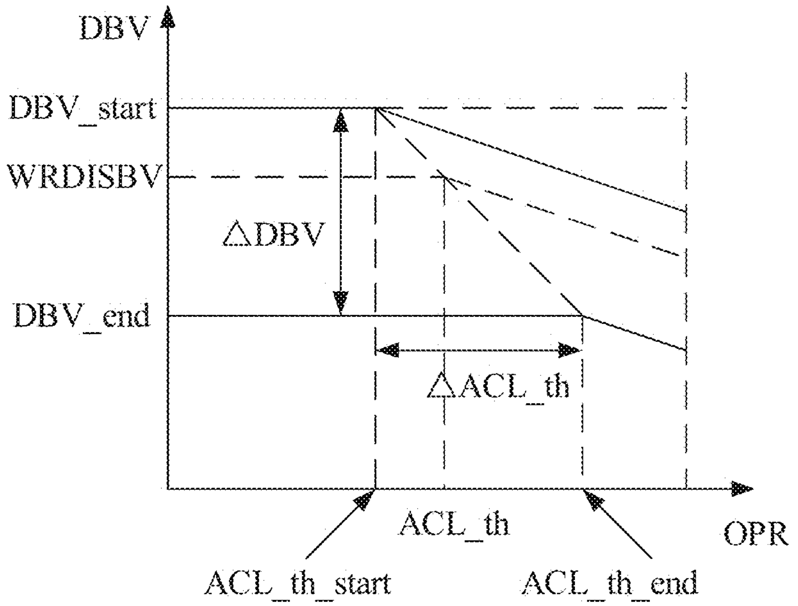
FIG. 4 is a schematic diagram of a first OPR according to some embodiments of the present disclosure.

Due to the ease of computation of the linear interpolation method, the first OPR can be acquired efficiently. Further, the difference between ACL_th_end and ACL_th_start may be represented as ΔACL_th, and the difference between DBV_start and DBV_end may be represented as ΔDBV. FIG. 4 is a schematic diagram of a first OPR according to some embodiments of the present disclosure, and the calculated first OPR can be illustrated in FIG. 4. Referring to FIG. 4, in the embodiments of the present disclosure, the greater the value of the OPR is, the smaller the DBV corresponding to the OPR is. Therefore, the greater the reference OPR is, the smaller the acquired reduced brightness value is.

In some embodiments of the present disclosure, the maximum reducible brightness value is acquired by performing linear interpolation. For example, in the case that the start point values of the plurality of brightness ranges include the first start point value and the second start point value, and the end point values of the plurality of brightness ranges include the first end point value and the second end point value, the brightness limiting module 12 is configured to: determine the OPR corresponding to the first end point value and the second end point value as the second OPR; and acquire the maximum reducible brightness value by performing linear interpolation at the initial brightness value based on the first start point value, the second start point value, the first end point value and the second end point value. In the case that both of the first end point value and the second end point value correspond to the maximum OPR, the second OPR is the maximum OPR.

The first end point value may be represented as ACL_lim_start, the second end point value may be represented as ACL_lim_end, and the maximum brightness value may be represented as ACL_lim. Continuously referring to FIG. 3, ACL_lim is acquired based on WRDISBV and DBV_start, DBV_end, ACL_lim_start and ACL_lim_end read from the second register. In some embodiments, based on DBV_start, DBV_end, ACL_lim_start and ACL_lim_end, ACL_lim is acquired by performing linear interpolation at WRDISBV according to the following Formula 4 and Formula 5.

$$ACL\_\text{lim} = ACL\_\text{lim\_start} - (DBV\_\text{start} - \text{WRDISBV}) * S2; \quad \text{(Formula 4)}$$

$$S2 = (ACL\_\text{lim\_start} - ACL\_\text{lim\_}end) / (DBV\_\text{start} - DBV\_end); \quad \text{(Formula 5)}$$

Figure 5:
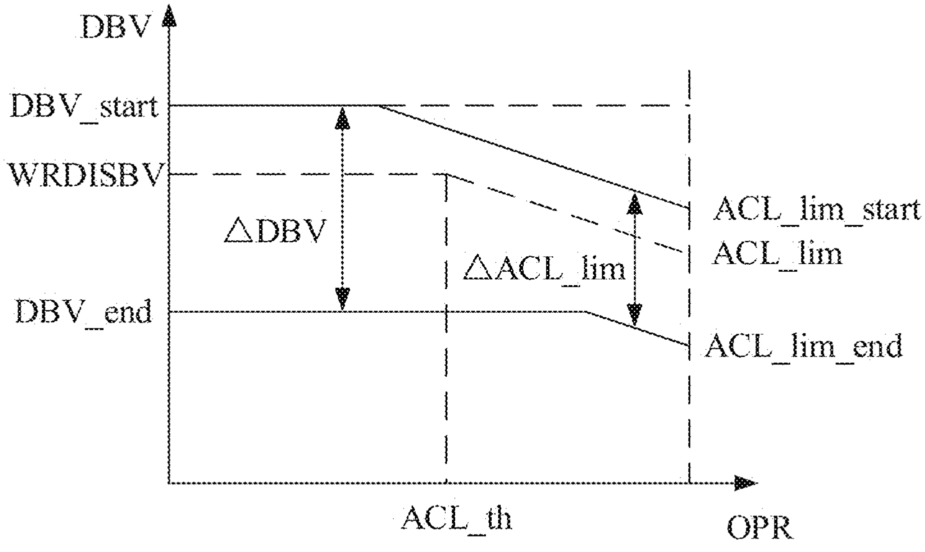
FIG. 5 is a schematic diagram of a maximum reducible brightness value according to some embodiments of the present disclosure.

Due to the case of computation of the linear interpolation method, the maximum reducible brightness value can be acquired efficiently. Further, the difference between ACL_lim_end and ACL_lim_start may be represented as ΔACL_lim, and the difference between DBV_start and DBV_end may be represented as ΔDBV. FIG. 5 is a schematic diagram of a maximum reducible brightness value according to some embodiments of the present disclosure, and the calculated maximum reducible brightness value can be illustrated in FIG. 5.

In some embodiments of the present disclosure, the maximum reducible brightness value is an end point of brightness reduction in the case that the initial brightness value is taken as the start point of brightness reduction. Therefore, in the case that the first OPR is the start point of the OPR corresponding to the start point of brightness reduction, the brightness limiting module 12 is capable of reducing the brightness to be displayed when the reference OPR is greater than or equal to the first OPR, and a minimum brightness value is the maximum reducible brightness value.

In some embodiments, the brightness limiting module 12 is configured to acquire the reduced brightness value by performing linear interpolation at the reference OPR based on the initial brightness value, the maximum reducible brightness value, the first OPR and the second OPR. For example, referring to FIG. 3, New_DBV is calculated by performing linear interpolation at $OPR_{refer}$ based on WRDISBV, ACL_lim, ACL_th and ACL_lim_max, wherein ACL_lim_max represents the second OPR, and New_DBV represents the reduced brightness value.

In some embodiments, New_DBV is acquired by performing linear interpolation at $OPR_{refer}$ based on WRDISBV, ACL_lim, ACL_th and ACL_lim_max according to following Formula 6.

$$New\_DBV = ACL\_\text{lim} + [(ACL\_\text{lim\_max} - OPR_{refer}) * (\text{WRDISBV} - ACL\_\text{lim}) / (ACL\_\text{lim\_max} - ACL\_th)]; \quad \text{(Formula 6)}$$

Due to the ease of computation of the linear interpolation method, New_DBV can be acquired efficiently.

FIGS. 6 to 9 are schematic diagrams of various brightness reduction values according to some embodiments of the present disclosure. Referring to FIGS. 6 to 9, the plurality of brightness ranges can be set differently based on different user requirements, i.e., ACL_th_start, ACL_th_end, ACL_lim_start and ACL_lim_end in FIGS. 6 to 9 are set differently based on different user's requirements, such that the acquired ACL_th and ACL_lim can be adjusted based on the user's requirements to realize the adaptation to the user's needs, thereby the acquired New_DBV is adjusted based on the user's requirements to realize the adaptation to the user's needs.

Figure 6:
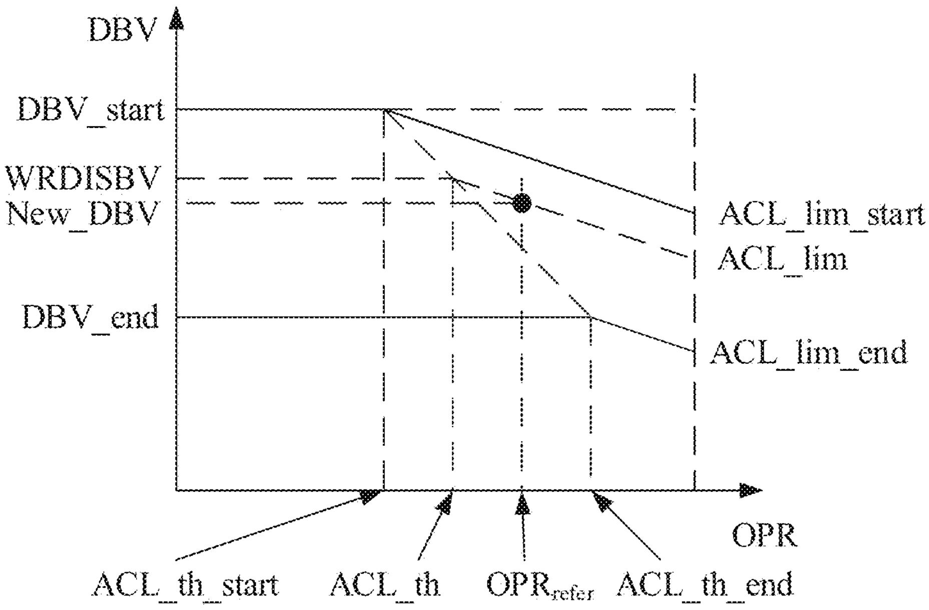
FIG. 6 is a schematic diagram of a reduced brightness value according to some embodiments of the present disclosure.
Figure 7:
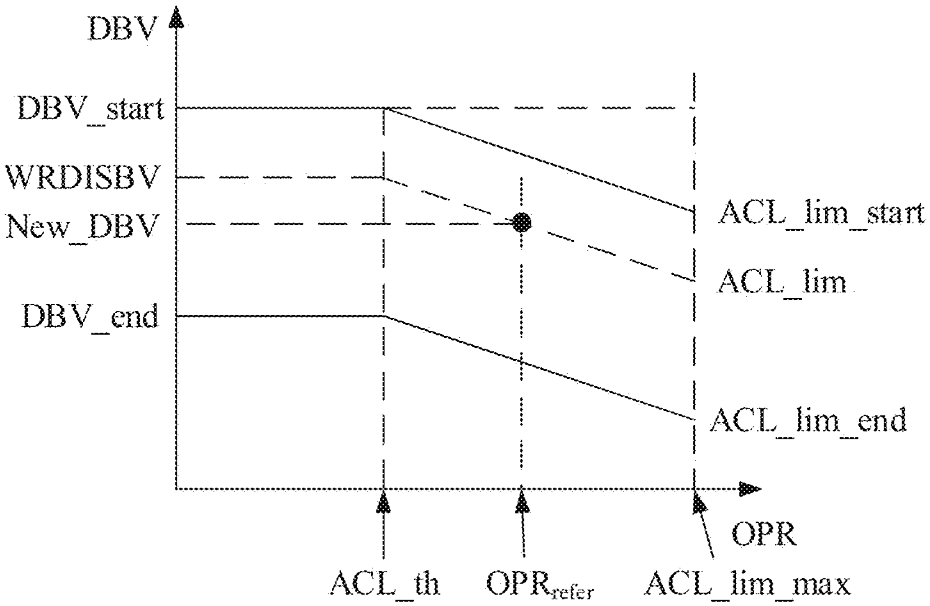
FIG. 7 is a schematic diagram of another reduced brightness value according to some embodiments of the present disclosure.

In the case that ACL_th_start is different from ACL_th_end, and ACL_lim_start is different from ACL_lim_end, the determined ACL_th, ACL_lim and reduced brightness value are illustrated in FIG. 6. In the case that ACL_th_start is the same as ACL_th_end, and ACL_lim_start is different from ACL_lim_end, the determined ACL_th, ACL_lim and reduced brightness value are illustrated in FIG. 7.

Figure 8:
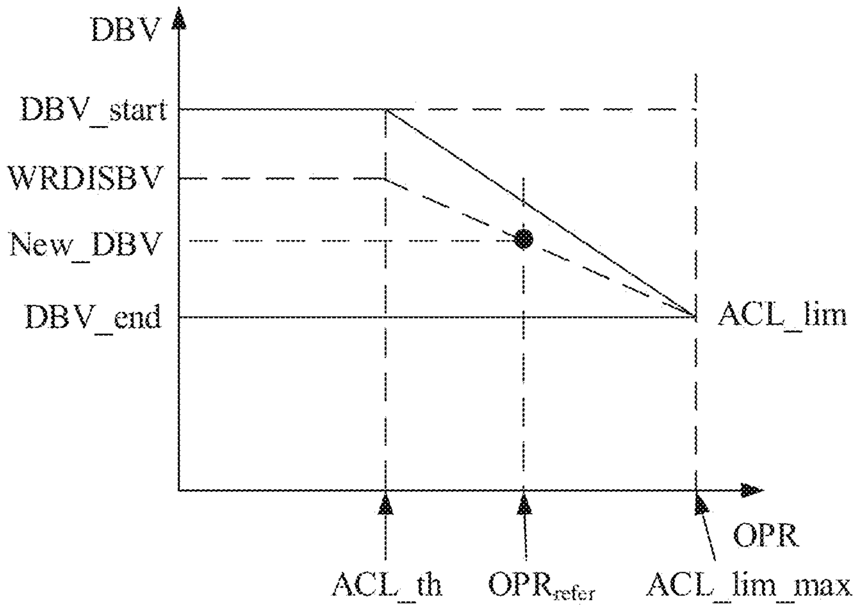
FIG. 8 is a schematic diagram of yet another reduced brightness value according to some embodiments of the present disclosure.
Figure 9:
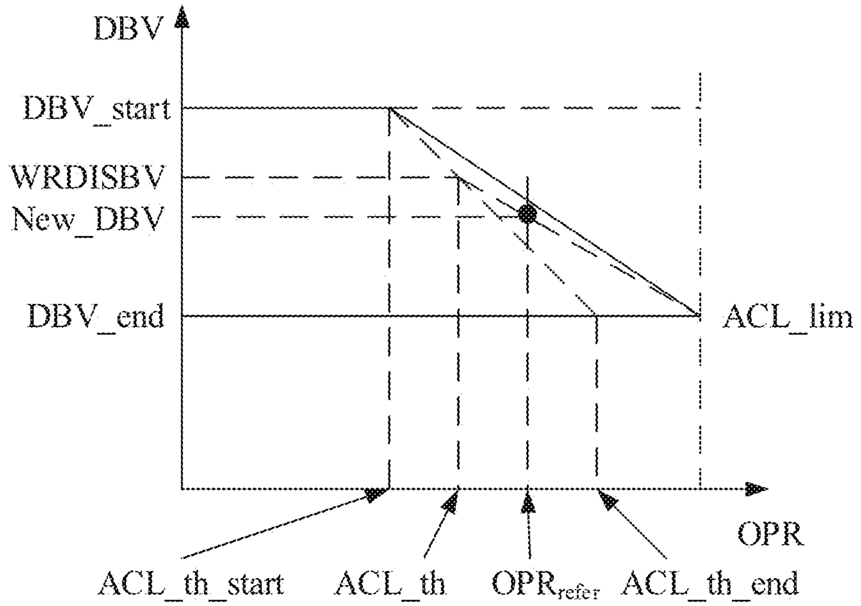
FIG. 9 is a schematic diagram of still yet another reduced brightness value according to some embodiments of the present disclosure.

In the case that ACL_th_start is the same as ACL_th_end, and ACL_Jim_start is the same as ACL_lim_end, the determined ACL_th, ACL_lim and reduced brightness value are illustrated in FIG. 8. In the case that ACL_th_start is different from ACL_th_end, and ACL_Jim_start is the same as ACL_lim_end, the determined ACL_th, ACL_lim and reduced brightness value are illustrated in FIG. 9.

In some embodiments, the driving module 13 is configured to control, based on the reference OPR and the reduced brightness value, current for driving the display panel, such that the display panel displays the image based on the reference OPR and the reduced brightness value.

According to the display driver provided by the embodiments of the present disclosure, the reduced brightness value corresponding to the reference OPR is acquired based on the plurality of brightness ranges and the reference OPR and the initial brightness value corresponding to the image. Because the plurality of brightness ranges can be set based on user's requirements, the acquired reduced brightness value corresponding to the reference OPR can be adapted to the user's requirements.

Furthermore, compared with a display panel that displays an image based on a reference OPR and an initial brightness value, the display panel that displays the image based on the reference OPR and the reduced brightness value is lower in power consumption. In addition, because the reduced brightness value is acquired based on the reference OPR, and the reference OPR indicates the OPR at which the display panel displays the image, the reduced brightness value has high adaptability to the on-pixel situation when the image is displayed.

Figure 10:
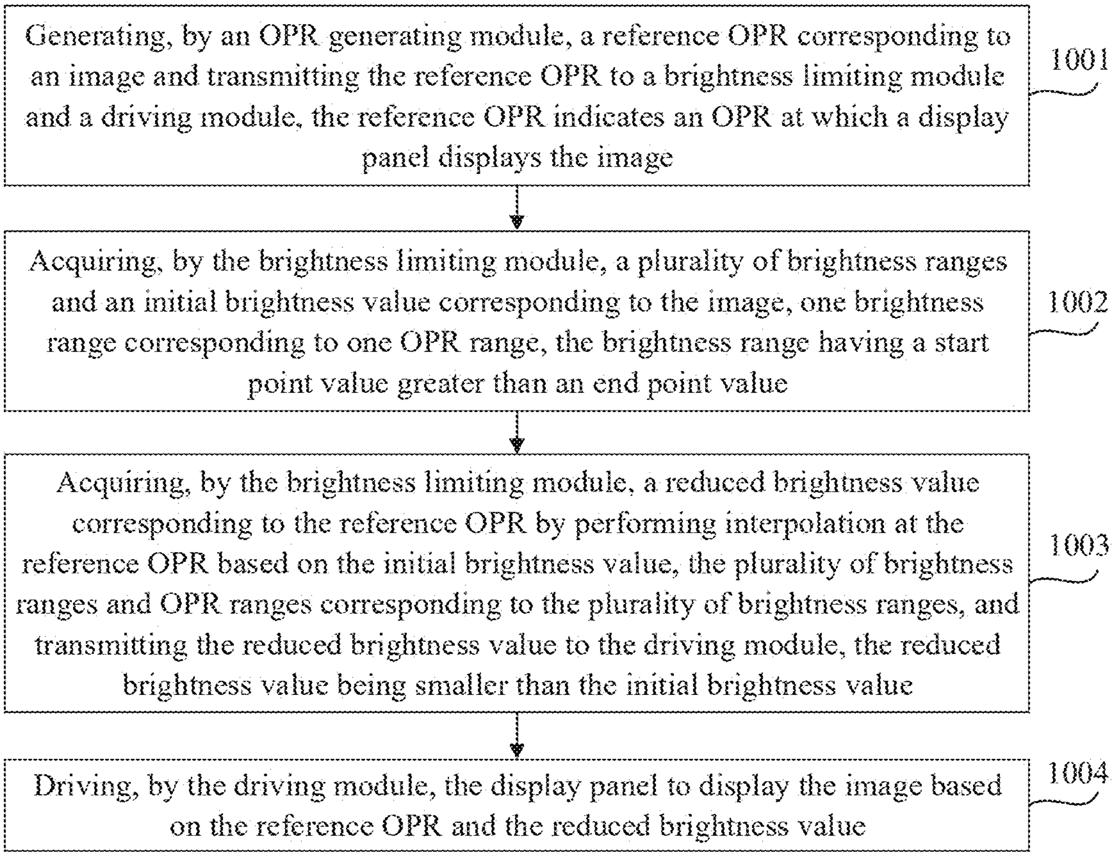
FIG. 10 is a flowchart of a method for driving a display according to some embodiments of the present disclosure.

Some embodiments of the present disclosure provides a method for driving a display. FIG. 10 is a flowchart of a method for driving a display according to some embodiments of the present disclosure. The method is applicable to the display driver 101 as illustrated in FIGS. 1 and 2. As illustrated in FIG. 10, the method includes but is not limited to processes 1001 to 1004.

In process 1001, an OPR generating module generates a reference OPR corresponding to an image and transmits the reference OPR to a brightness limiting module and a driving module, the reference OPR indicating an OPR at which a display panel displays the image.

A reference is made to relevant descriptions about generation of the reference OPR by the OPR generating module 11 for the execution process of process 1001, which is not described any further.

In process 1002, the brightness limiting module acquires a plurality of brightness ranges and an initial brightness value corresponding to the image, one brightness range corresponding to one OPR range, a start point value of the brightness range being greater than an end point value of the brightness range.

A reference is made to relevant descriptions about acquisition of the initial brightness values and the plurality of brightness ranges by the OPR generating module 12 for the execution process of process 1002, which is not described any further.

In process 1003, the brightness limiting module acquires a reduced brightness value corresponding to the reference OPR by performing interpolation at the reference OPR based on the initial brightness value, the plurality of brightness ranges and OPR ranges corresponding to the plurality of brightness ranges, and transmits the reduced brightness value to the driving module, the reduced brightness value being smaller than the initial brightness value.

A reference is made to relevant descriptions about acquisition of the reduced brightness value by the brightness limiting module 12 for the execution process of process 1003.

In some embodiments, acquiring the reduced brightness value corresponding to the reference OPR by performing interpolation at the reference OPR based on the initial brightness value, the plurality of brightness ranges and the OPR ranges corresponding to the plurality of brightness ranges includes: acquiring, based on the initial brightness value, the plurality of brightness ranges, and the OPR ranges corresponding to the plurality of brightness ranges, a first OPR corresponding to the initial brightness value, a maximum reducible brightness value taking the initial brightness value as a start point value, and a second OPR corresponding to the maximum reducible brightness value; and acquiring the reduced brightness value corresponding to the reference OPR by performing interpolation at the reference OPR based on the initial brightness value, the maximum reducible brightness value, the first OPR and the second OPR.

In some embodiments, acquiring, based on the initial brightness value, the plurality of brightness ranges, and the OPR ranges corresponding to the plurality of brightness ranges, the first OPR corresponding to the initial brightness value, the maximum reducible brightness value taking the initial brightness value as the start point value, and the second OPR corresponding to the maximum reducible brightness value includes: acquiring the first OPR based on the initial brightness value, start point values of the plurality of brightness ranges and OPRs corresponding to the start point values; and acquiring the maximum reducible brightness value and the second OPR based on the initial brightness value, the start point values of the plurality of brightness ranges, end point values of the plurality of brightness ranges, and OPRs corresponding to the end point values.

In some embodiments, the start point values of the plurality of brightness ranges include a first start point value and a second start point value, the first start point value being greater than the initial brightness value, the second start point value being smaller than the initial brightness value; and acquiring the first OPR based on the initial brightness value, the start point values of the plurality of brightness ranges and the OPRs corresponding to the start point values includes: acquiring the first OPR by performing linear interpolation at the initial brightness value based on the first start point value, an OPR corresponding to the first start point value, the second start point value and an OPR corresponding to the second start point value.

In some embodiments, the start point values of the plurality of brightness ranges include a first start point value and a second start point value, the first start point value being greater than the initial brightness value, the second start point value being smaller than the initial brightness value; the end point values of the plurality of brightness ranges include a first end point value and a second end point value, the first end point value and the second end point value corresponding to a same OPR; and acquiring the maximum reducible brightness value and the second OPR based on the initial brightness value, the start point values of the plurality of brightness ranges, the end point values of the plurality of brightness ranges, and the OPRs corresponding to the end point values includes: determining the OPR corresponding to the first end point value and the second end point value as the second OPR; and acquiring the maximum reducible brightness value by performing linear interpolation at the initial brightness value based on the first start point value, the second start point value, the first end point value and the second end point value.

In some embodiments, acquiring the reduced brightness value corresponding to the reference OPR by performing interpolation at the reference OPR based on the initial brightness value, the maximum reducible brightness value, the first OPR and the second OPR includes: acquiring the reduced brightness value by performing linear interpolation at the reference OPR based on the initial brightness value, the maximum reducible brightness value, the first OPR and the second OPR.

In process 1004, the driving module drives the display panel to display the image based on the reference OPR and the reduced brightness value.

A reference is made to relevant descriptions about driving of the display panel by the driving module 13 for the execution process of process 1004, which will not be described any further.

According to the method provided by the embodiments of the present disclosure, the reduced brightness value corresponding to the reference OPR is acquired based on the plurality of brightness ranges, the reference OPR and the initial brightness value corresponding to the image. Because the plurality of brightness ranges can be set based on user's requirements, the acquired reduced brightness value corresponding to the reference OPR can be adapted to the user's requirements.

Furthermore, compared with a display panel that displays an image based on the reference OPR and the initial brightness value, the display panel that displays the image based on the reference OPR and the reduced brightness value is lower in power consumption. In addition, because the reduced brightness value is acquired based on the reference OPR, and the reference OPR indicates the OPR at which the display panel displays the image, the reduced brightness value has high adaptability to the on-pixel situation when the image is displayed.

Figure 11:
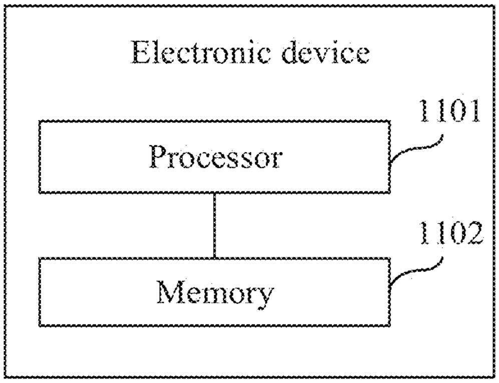
FIG. 11 is a schematic structural diagram of an electronic device according to some embodiments of the present disclosure.

FIG. 11 is a schematic structural diagram of an electronic device according to some embodiments of the present disclosure. The electronic device may include the display driver 101 and the display panel 102 as illustrated in FIG. 1. The electronic device may be quite different in configuration or performance. For example, the electronic device includes at least one processor 1101 and at least one memory 1102, wherein the processor 1101 may be a central processing unit (CPU), at least one computer program is stored in the at least one memory 1102, and the at least one computer program, when loaded and run by the at least one processor 1101, causes the electronic device to perform the method for driving a display provided by the various method embodiments described above. The electronic device may be provided with components, such as a wired or wireless network interface, a keyboard and an input/output interface, for the ease of input and output, and the electronic device may include other components for achieving the functions of the device, which are not described any further.

In some embodiments, the display driver 101 is implemented via hardware circuitry. For example, the OPR generating module 11, the brightness limiting module 12, and the driving module 13 are implemented via hardware circuitry.

In some embodiments, a chip is provided. The chip includes a processor, and the processor, when loading at least one instruction from a memory and executing the at least one instruction, causes a device equipped with the chip to perform any one of the methods for driving a display described above.

In some embodiments, an electronic device is provided, and the electronic device includes the chip described above. In some embodiments, an electronic device is provided, the electronic device includes a processor and a memory, at least one computer program is stored in the memory, and the at least one computer program, when loaded and run by at least one processor, causes the electronic device to perform any one of the methods for driving a display described above.

In some embodiments, a computer-readable storage medium is provided. At least one computer program is stored in the computer-readable storage medium, and the at least one computer program, when loaded and run by a processor of an electronic device, causes the electronic device to perform any one of the methods for driving a display described above. The computer-readable storage medium may be a non-transitory computer-readable storage medium.

In some embodiments, the computer-readable storage medium is a read-only memory (ROM), a random access memory (RAM), a compact disc read-only memory (CD-ROM), a magnetic tape, a floppy disk, an optical data storage device, or the like.

In some embodiment, a computer program product or a computer program is provided. The computer program product or the computer program includes a computer instruction stored in a computer-readable storage medium. A processor of an electronic device reads the computer instruction from the computer-readable storage medium, and the processor, when executing the computer instruction, causes the electronic device to perform any one of the methods for driving a display described above.

It should be noted that the information (including but not limited to user device information, user personal information, or the like), data (including but not limited to data for analysis, stored data for storage, data for display, or the like) and signals involved in the present disclosure are all authorized by a user or fully authorized by all parties, and the collection, use and processing of relevant data need to comply with relevant laws, regulations and standards of relevant countries and regions.

It should be understood that the term "plurality" herein refers to two or more, and the term "and/or" describes the corresponding relationship between corresponding objects, indicating three kinds of relationships. For example, the phrase "A and/or B" can represent: A is present alone, A and B are present concurrently, B is present alone. The character "/" generally indicates an "OR" relationship between contextual objects.

It should be noted that the terms "first," "second," and the like in the description and claims of the present disclosure are used for the purpose of distinguishing similar objects instead of indicating a particular order or sequence. It should be understood that data used in this way are interchangeable where appropriate, such that the embodiments of the present disclosure described herein can be implemented in a sequence other than those illustrated or described herein.

The implementations described in the above embodiments do not represent all implementations consistent with the present disclosure. Instead, they are merely examples of devices and methods consistent with aspects related to the present disclosure as recited in the appended claims.

Described above are merely embodiments of the present disclosure, and are not intended to limit the present disclosure. Any modifications, equivalent substitutions, improvements, and the like made within the spirit and principles of the present disclosure are considered to be within the protection scope of the present disclosure.

The invention claimed is:

1. A display driver, comprising an on-pixel ratio (OPR) generating module, a brightness limiting module and a driving module, the OPR generating module being connected to the brightness limiting module and the driving module, the brightness limiting module being further connected to the driving module;

wherein the OPR generating module is configured to generate a reference OPR corresponding to an image and transmit the reference OPR to the brightness limiting module and the driving module, the reference OPR indicating an OPR at which a display panel displays the image;

the brightness limiting module is configured to acquire a plurality of brightness ranges and an initial brightness value corresponding to the image, one brightness range corresponding to one OPR range, a start point value of the brightness range being greater than an end point value of the brightness range;

the brightness limiting module is further configured to acquire a reduced brightness value corresponding to the reference OPR by performing interpolation at the reference OPR based on the initial brightness value, the plurality of brightness ranges and OPR ranges corresponding to the plurality of brightness ranges, and transmit the reduced brightness value to the driving module, the reduced brightness value being smaller than the initial brightness value; and the driving module is configured to drive the display panel to display the image based on the reference OPR and the reduced brightness value.

2. The display driver according to claim 1, wherein the brightness limiting module is configured to:

acquire, based on the initial brightness value, the plurality of brightness ranges, and the OPR ranges corresponding to the plurality of brightness ranges, a first OPR corresponding to the initial brightness value, a maximum reducible brightness value taking the initial brightness value as a start point value, and a second OPR corresponding to the maximum reducible brightness value; and acquire the reduced brightness value corresponding to the reference OPR by performing interpolation at the reference OPR based on the initial brightness value, the maximum reducible brightness value, the first OPR and the second OPR.

3. The display driver according to claim 2, wherein the brightness limiting module is configured to:

acquire the first OPR based on the initial brightness value, start point values of the plurality of brightness ranges and OPRs corresponding to the start point values; and acquire the maximum reducible brightness value and the second OPR based on the initial brightness value, the start point values of the plurality of brightness ranges, end point values of the plurality of brightness ranges, and OPRs corresponding to the end point values.

4. The display driver according to claim 3, wherein the start point values of the plurality of brightness ranges comprise a first start point value and a second start point value, the first start point value being greater than the initial brightness value, the second start point value being smaller than the initial brightness value; and the brightness limiting module is configured to:

acquire the first OPR by performing linear interpolation at the initial brightness value based on the first start point value, an OPR corresponding to the first start point value, the second start point value and an OPR corresponding to the second start point value.

5. The display driver according to claim 4, wherein the brightness limiting module is configured to:

acquire the reduced brightness value by performing linear interpolation at the reference OPR based on the initial brightness value, the maximum reducible brightness value, the first OPR and the second OPR.

6. The display driver according to claim 3, wherein the start point values of the plurality of brightness ranges comprise a first start point value and a second start point value, the first start point value being greater than the initial brightness value, the second start point value being smaller than the initial brightness value; the end point values of the plurality of brightness ranges comprise a first end point value and a second end point value, the first end point value and the second end point value corresponding to a same OPR; and the brightness limiting module is configured to:

determine the OPR corresponding to the first end point value and the second end point value as the second OPR; and acquire the maximum reducible brightness value by performing linear interpolation at the initial brightness value based on the first start point value, the second start point value, the first end point value and the second end point value.

7. The display driver according to claim 6, wherein the brightness limiting module is configured to:

acquire the reduced brightness value by performing linear interpolation at the reference OPR based on the initial brightness value, the maximum reducible brightness value, the first OPR and the second OPR.

8. The display driver according to claim 3, wherein the brightness limiting module is configured to:

acquire the reduced brightness value by performing linear interpolation at the reference OPR based on the initial brightness value, the maximum reducible brightness value, the first OPR and the second OPR.

9. The display driver according to claim 2, wherein the brightness limiting module is configured to:

acquire the reduced brightness value by performing linear interpolation at the reference OPR based on the initial brightness value, the maximum reducible brightness value, the first OPR and the second OPR.

10. A method for driving a display, comprising:

generating, by an on-pixel ratio (OPR) generating module, a reference OPR corresponding to an image and transmitting the reference OPR to a brightness limiting module and a driving module, the reference OPR indicating an OPR at which a display panel displays the image;

acquiring, by the brightness limiting module, a plurality of brightness ranges and an initial brightness value corresponding to the image, one brightness range corresponding to one OPR range, a start point value of the brightness range being greater than an end point value of the brightness range;

acquiring, by the brightness limiting module, a reduced brightness value corresponding to the reference OPR by performing interpolation at the reference OPR based on the initial brightness value, the plurality of brightness ranges and OPR ranges corresponding to the plurality of brightness ranges, and transmitting the reduced brightness value to the driving module, the reduced brightness value being smaller than the initial brightness value; and driving, by the driving module, the display panel to display the image based on the reference OPR and the reduced brightness value.

11. The method according to claim 10, wherein acquiring the reduced brightness value corresponding to the reference OPR by performing interpolation at the reference OPR based on the initial brightness value, the plurality of brightness ranges and the OPR ranges corresponding to the plurality of brightness ranges comprises:

acquiring, based on the initial brightness value, the plurality of brightness ranges, and the OPR ranges corresponding to the plurality of brightness ranges, a first OPR corresponding to the initial brightness value, a maximum reducible brightness value taking the initial brightness value as a start point value, and a second OPR corresponding to the maximum reducible brightness value; and acquiring the reduced brightness value corresponding to the reference OPR by performing interpolation at the reference OPR based on the initial brightness value, the maximum reducible brightness value, the first OPR and the second OPR.

12. The method according to claim 11, wherein acquiring, based on the initial brightness value, the plurality of brightness ranges, and the OPR ranges corresponding to the plurality of brightness ranges, the first OPR corresponding to the initial brightness value, the maximum reducible brightness value taking the initial brightness value as the start point value, and the second OPR corresponding to the maximum reducible brightness value comprises:

acquiring the first OPR based on the initial brightness value, start point values of the plurality of brightness ranges and OPRs corresponding to the start point values; and acquiring the maximum reducible brightness value and the second OPR based on the initial brightness value, the start point values of the plurality of brightness ranges, end point values of the plurality of brightness ranges, and OPRs corresponding to the end point values.

13. The method according to claim 12, wherein the start point values of the plurality of brightness ranges comprise a first start point value and a second start point value, the first start point value being greater than the initial brightness value, the second start point value being smaller than the initial brightness value; and acquiring the first OPR based on the initial brightness value, the start point values of the plurality of brightness ranges and the OPRs corresponding to the start point values comprises:

acquiring the first OPR by performing linear interpolation at the initial brightness value based on the first start point value, an OPR corresponding to the first start point value, the second start point value and an OPR corresponding to the second start point value.

14. The method according to claim 13, wherein acquiring the reduced brightness value corresponding to the reference OPR by performing interpolation at the reference OPR based on the initial brightness value, the maximum reducible brightness value, the first OPR and the second OPR comprises:

acquiring the reduced brightness value by performing linear interpolation at the reference OPR based on the initial brightness value, the maximum reducible brightness value, the first OPR and the second OPR.

15. The method according to claim 12, wherein the start point values of the plurality of brightness ranges comprise a first start point value and a second start point value, the first start point value being greater than the initial brightness value, the second start point value being smaller than the initial brightness value; the end point values of the plurality of brightness ranges comprise a first end point value and a second end point value, the first end point value and the second end point value corresponding to a same OPR; and acquiring the maximum reducible brightness value and the second OPR based on the initial brightness value, the start point values of the plurality of brightness ranges, the end point values of the plurality of brightness ranges, and the OPRs corresponding to the end point values comprises:

determining the OPR corresponding to the first end point value and the second end point value as the second OPR; and acquiring the maximum reducible brightness value by performing linear interpolation at the initial brightness value based on the first start point value, the second start point value, the first end point value and the second end point value.

16. The method according to claim 15, wherein acquiring the reduced brightness value corresponding to the reference OPR by performing interpolation at the reference OPR based on the initial brightness value, the maximum reducible brightness value, the first OPR and the second OPR comprises:

acquiring the reduced brightness value by performing linear interpolation at the reference OPR based on the initial brightness value, the maximum reducible brightness value, the first OPR and the second OPR.

17. The method according to claim 12, wherein acquiring the reduced brightness value corresponding to the reference OPR by performing interpolation at the reference OPR based on the initial brightness value, the maximum reducible brightness value, the first OPR and the second OPR comprises:

acquiring the reduced brightness value by performing linear interpolation at the reference OPR based on the initial brightness value, the maximum reducible brightness value, the first OPR and the second OPR.

18. The method according to claim 11, wherein acquiring the reduced brightness value corresponding to the reference OPR by performing interpolation at the reference OPR based on the initial brightness value, the maximum reducible brightness value, the first OPR and the second OPR comprises:

acquiring the reduced brightness value by performing linear interpolation at the reference OPR based on the initial brightness value, the maximum reducible brightness value, the first OPR and the second OPR.

19. A chip, comprising at least one processor, wherein the at least one processor, when loading at least one instruction from a memory and executing the at least one instruction, causes a device equipped with the chip to perform:

generating, by an on-pixel ratio (OPR) generating module, a reference OPR corresponding to an image and transmitting the reference OPR to a brightness limiting module and a driving module, the reference OPR indicating an OPR at which a display panel displays the image;

acquiring, by the brightness limiting module, a plurality of brightness ranges and an initial brightness value corresponding to the image, one brightness range corresponding to one OPR range, a start point value of the brightness range being greater than an end point value of the brightness range;

acquiring, by the brightness limiting module, a reduced brightness value corresponding to the reference OPR by performing interpolation at the reference OPR based on the initial brightness value, the plurality of brightness ranges and OPR ranges corresponding to the plurality of brightness ranges, and transmitting the reduced brightness value to the driving module, the reduced brightness value being smaller than the initial brightness value; and driving, by the driving module, the display panel to display the image based on the reference OPR and the reduced brightness value.

20. An electronic device, comprising a chip as defined in claim 19.

* * * * *